United States Patent
Einfeldt et al.

(10) Patent No.: US 6,944,295 B2
(45) Date of Patent: Sep. 13, 2005

(54) DATA-PROCESSING DEVICE AND METHOD OF OPERATING SAID DEVICE

(75) Inventors: Walter Einfeldt, Uetersen (DE); Ernst Bretschneider, Erfurt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 948 days.

(21) Appl. No.: 09/754,635

(22) Filed: Jan. 4, 2001

(65) Prior Publication Data

US 2001/0012364 A1 Aug. 9, 2001

(30) Foreign Application Priority Data

Jan. 8, 2000 (DE) .......................................... 100 00 502

(51) Int. Cl.[7] .............................. H04K 1/00; G06F 7/58
(52) U.S. Cl. ........................ 380/28; 380/268; 708/250; 708/251
(58) Field of Search .......................... 380/28, 268, 263, 380/46; 708/250, 251, 253, 254, 255, 256

(56) References Cited

U.S. PATENT DOCUMENTS

| | | | | |
|---|---|---|---|---|
| 4,799,259 A | * | 1/1989 | Ogrodski ...................... | 380/46 |
| 5,007,087 A | * | 4/1991 | Bernstein et al. ............. | 380/46 |
| 5,570,307 A | * | 10/1996 | Takahashi .................... | 708/256 |
| 5,781,458 A | * | 7/1998 | Gilley ......................... | 708/255 |
| 6,714,955 B2 | * | 3/2004 | Le Quere .................... | 708/250 |

FOREIGN PATENT DOCUMENTS

WO   WO9704370   2/1997  ......... G05B/19/409

* cited by examiner

*Primary Examiner*—Matthew Smithers
(74) *Attorney, Agent, or Firm*—Kevin Simons

(57) ABSTRACT

The invention relates to a method of generating a random-number sequence, and to a random-number generator, particularly for a chip card or a smart card. The random-number generator comprises:

a predetermined number Nosz of mutually independent frequency oscillators (10, 12), a predetermined number Nosz of flip-flops (14, 16), in which an output (26) of a frequency oscillator (10, 12) is connected to an input D (30) of a flip-flop (14, 16), a logic circuit element (18) receiving outputs Q (32) of the flip-flops (14, 16) as input values (36, 38) and, in accordance with a predetermined logic operation, assigns an output value (40) to these input values (36, 38), a parity circuit (20) determining the parity of a predetermined number Nlog of output values (40) from the logic circuit element (18), a random-number register (22) which buffers a predetermined number Nz of parity numbers (44) from the parity circuit (20) and supplies them as Nz bit random number, and an input (58) for an external clock signal source which clocks the flip-flops (14, 16), the parity circuit (20) and the random-number register (22).

20 Claims, 1 Drawing Sheet

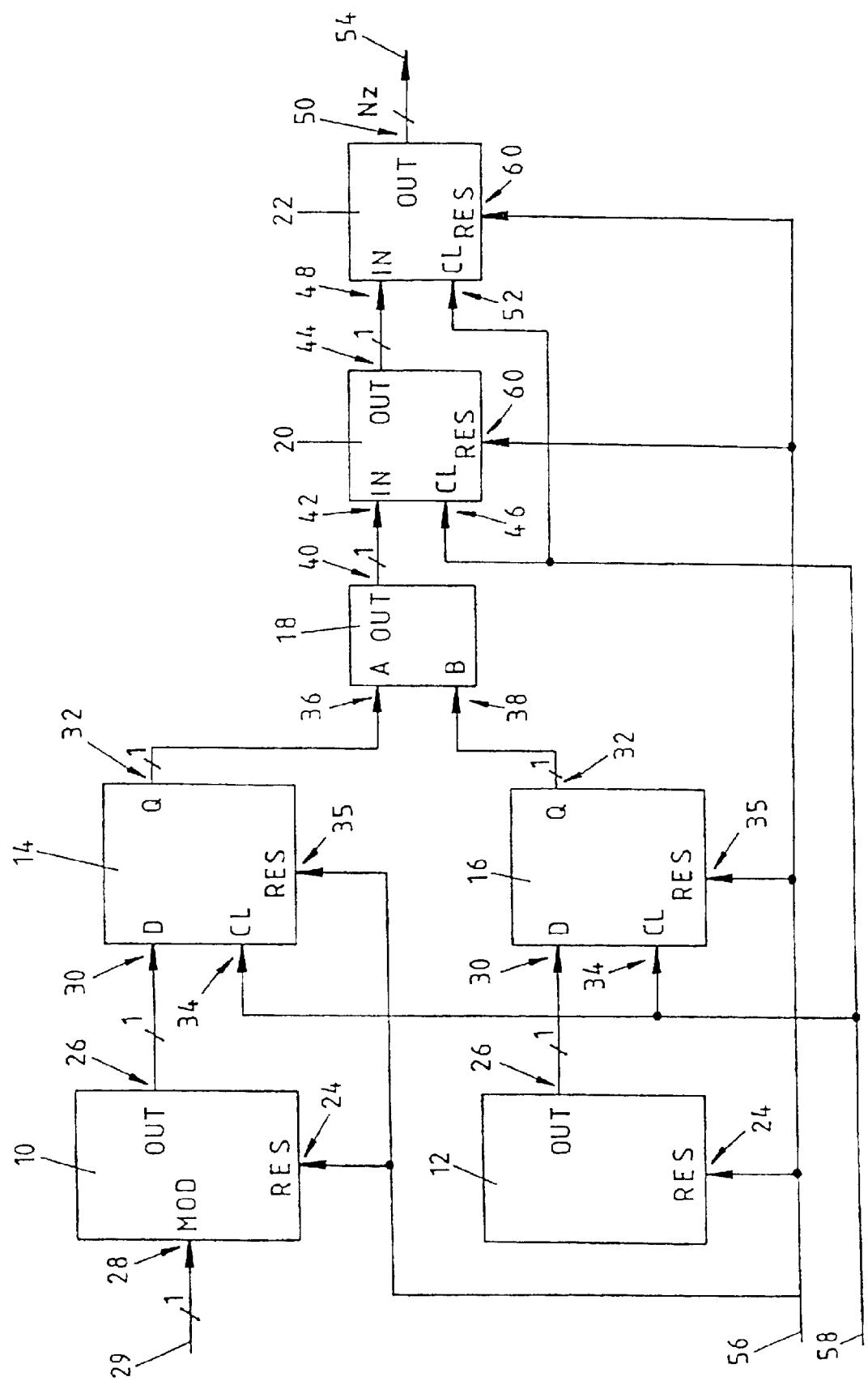

DATA-PROCESSING DEVICE AND METHOD OF OPERATING SAID DEVICE

The invention relates to a method of generating a random-number sequence particularly in a chip card or smart card. The Invention also rotates to a random-number generator.

In many data-processing devices with integrated circuits, for example, cryptographic operations serve to protect the operation of these devices or to protect data transported in these devices. The computing operations required for this purpose are performed by standard processing units (CPU) and by dedicated crypto-processing units (co-processors). Typical examples are chip cards or IC cards such as, for example, smart cards. The data or intermediate results used in this respect is generally security-relevant information such as, for example, cryptographic keys or operands.

Data-processing devices such as, for example, the abovementioned smart card performing cryptographic operations require an integrated or "on-chip" random-number generator.

A digital random-number generator is known from U.S. Pat. No. 4,799,259, in which a plurality of frequency oscillators is connected to an Exclusive-OR network (XOR). This XOR network supplies a random signal from its output, which signal is applied to a flip-flop. At each clock signal, the flip-flop scans the output of the XOR network and stores a corresponding value or supplies it from its output. Both the frequency oscillators and the flip-flop are clocked by one and the same signal source. For generating a sequence of random numbers, this clock signal is therefore derived from a digital noise clock signal source. However, this is particularly elaborate and cost-intensive when the generation of random numbers is to be integrated on a chip.

A random-number generator having a plurality of high-frequency ring oscillators and a voltage-controlled low-frequency oscillator receiving a noise signal as input signal is known from WO 97/4370. Dependent on the output signal of the voltage-controlled low-frequency oscillator, the high-frequency ring oscillators are scanned. To this end, each frequency oscillator precedes a flip-flop controlled by the clock of the low-frequency oscillator, ensuring that the generated random numbers of corresponding zeroes and ones occur with the same probability or at the same frequency.

It is an object of the invention to provide an improved method and an improved random generator of the type described above, which eliminate the abovementioned drawbacks and allow independent "on-chip" generation of random numbers.

This object is solved by means of a method of the type described above and as defined in the characterizing part of claim 1 and by means of a random-number generator of the type described above and as defined in the characterizing part of claim 11.

According to the invention, a method of the type described above comprises the steps of (a) scanning the outputs of Nosz independent frequency oscillators and buffering corresponding Nosz output signals of the Nosz frequency oscillators at each clock of a clock signal from an external clock signal source, (b) applying the buffered signals of step (a) to a logic operation assigning a predetermined output value to the Nosz buffered signals as input values, (c) generating the parity of a predetermined number Nlog of output values of step (b) at each $Nlog^{th}$ clock of the external clock signal, (d) storing a predetermined number Nz of parity numbers in a random-number register, and (e) reading all of the Nz*Nlog clocks of the clock signal as a random number from the random-number register.

This has the advantage that an independent random-number sequence is available in a simple and low-cost manner, which can be essentially produced "on-chip" and only requires an external clock signal.

Advantageous further embodiments of the method are defined in claims 2 to 10.

To achieve a possibly equally high probability of the random numbers in the random-number sequence, the frequency of at least one frequency oscillator is changed and/or modulated in dependence upon an MSB (Most Significant Bit) of a signature register, while, for example, the frequency of the changed or modulated frequency oscillator is switched between >20 MHz and >40 MHz in dependence upon the MSB of the signature register.

In a preferred embodiment, the frequency of at least one frequency oscillator is selected to be >30 MHz, and the frequency oscillators are voltage-controlled or current-controlled. In step (a), the output signals of the two frequency oscillators are buffered, for example, in a respective flip-flop, particularly a delay flip-flop (D–F/F). The number Nosz is, for example, an integer which is larger than or equal to 1, particularly Nosz=2, and the numbers Nlog and Nz are suitably integers which are larger than or equal to 1.

Suitably, in step (c) the logic operation is an AND operation (AND), an OR operation (OR), a NOR operation (NOR), an Exclusive-OR operation (XOR), a NAND operation (NAND) or an Exclusive-NOR operation (XNOR).

To avoid returning samples in the random-number sequence, the frequencies of the Nosz frequency oscillators are selected to be such that no frequency of a frequency oscillator is an integral multiple of another frequency oscillator or of the external clock signal.

Furthermore, a random-number generator according to the invention comprises:

a predetermined number Nosz of mutually independent frequency oscillators, a predetermined number Nosz of flip-flops, in which an output of a frequency oscillator is connected to an input D of a flip-flop, a logic circuit element receiving outputs Q of the flip-flops as input values and, in accordance with a predetermined logic operation, assigns an output value to these input values, a parity circuit determining the parity of a predetermined number Nlog of output values from the logic circuit element, a random-number register which buffers a predetermined number Nz of parity numbers from the parity circuit and supplies them as Nz bit random number, and an input for an external clock signal source which clocks the flip-flops, the parity circuit and the random-number register.

This has the advantage that, for generating a random number sequence, a simple and low-cost random-number generator is available which can be integrated in a simple and low-cost manner on a chip and only requires a simple external clock signal.

Advantageous further embodiments of the random-number generator are defined in claims 12 to 20.

To achieve a possibly equally high probability of the random numbers in the random-number sequence, at least a frequency oscillator is connected to an output of a signature register which applies an MSB (Most Significant Bit) to the frequency oscillator, while the frequency oscillator connected to the signature register is formed, for example, in such a way that it switches its frequency between >20 MHz and >40 MHz in dependence upon the MSB of the signature register.

In a preferred embodiment, the frequency of at least one frequency oscillator is >30 MHz, and the frequency oscillators are formed as voltage-controlled or current-controlled frequency oscillators. At least one flip-flop is formed as a delay flip-flop (D–F/F). Nosz is, for example, an integer which is larger than or equal to 1, particularly, Nosz=2, and Nlog as well as Nz are suitably integers which are larger than or equal to 1.

Suitably, the logic circuit element is an AND element (AND), an OR element (OR), a NOR element (NOR), an Exclusive-OR element (XOR), a NAND element (NAND) or an Exclusive-NOR element (XNOR).

To avoid a returning sample in the random-number sequence, the Nosz frequency oscillators are formed in such a way that no frequency of a frequency oscillator is an integral multiple of another frequency oscillator or of the external clock signal.

These and other aspects of the invention are apparent from and will be elucidated with reference to the embodiments described hereinafter.

In the drawing:

The sole FIGURE is a block diagram of a preferred embodiment of a random-number generator according to the invention.

The preferred embodiment shown in the sole FIGURE of a random-number generator according to the invention comprises two frequency oscillators 10 (OSC1) and 12 (OSC2), two flip-flops 14 (LATCH1) and 16 (LATCH2) of the delay flip-flop type (D–F/F), a logic circuit element 18 (XNOR) performing an Exclusive-NOR operation (XNOR), a parity generator 20 (PARITY) and a random-number register 22 (REG).

The frequency oscillators 10, 12 have a reset input RES 24 and an output OUT 26. The frequency oscillator 10 (OSC1) in the upper part of the FIGURE also has an input MOD 28 which is connected to an output of a signature register (not shown). It supplies to the frequency oscillator 10 consecutive MSB (Most Significant Bit) of the signature register in a bit stream (SIGMSB 29) and thereby varies an operating frequency of the frequency oscillator 10 (OSC1).

The flip-flops 14, 16 have an input D 30 connected to an output OUT 26 of a frequency oscillator 10, 12, an output Q 32, a clock input CL 34 and a reset input RES 35. The logic circuit element 18 has two inputs A 36 and B 38 connected to the output Q 32, as well as an output OUT 40. The parity generator 20 has an input IN 42 connected to the output OUT 40 of the logic circuit element 18, an output OUT 44 and a clock input CL 46. The random-number register 22 has an input IN 48 connected to the output OUT 44 of the parity generator 20, an output OUT 50 and a clock input CL 52. The output OUT 50 of the random-number generator is connected to a data bus 54.

An external reset signal 56 (RESET) is applied, if necessary, to the respective inputs RES 24 of the frequency oscillators 10, 12 and to the inputs RES 35 of the flip-flops 14, 16. An external clock signal 58 (EXTCLK) is applied to the clock inputs 34, 36 and 52 of flip-flops 14 and 16, parity generator 20 and random-number register 22. Reset inputs RES 60 of parity generator 20 and random-number register 22 are also connected to the external reset signal 56 (RESET).

The frequency oscillators 10, 12 are formed as "on-chip" frequency oscillators, i.e. they are integrated on a chip, and as current-controlled oscillators (CCO). They are therefore not influenced by an input or operating voltage. The frequency oscillator 12 (OSC2) in the lower part of the Figure generates a frequency >30 MHz, while the frequency oscillator 10 (OSC1) in the upper part of the Figure switches its frequency between >20 MHz and >40 MHz in dependence upon the continuous bit stream of the signature register (SIGMSB 29). The frequencies of the frequency oscillators 10, 12 are chosen to be such that they are not mutually integral multiples of each other and are neither integral multiples of the external clock frequency 58.

The mode of operation of the random-number generator according to the invention will hereinafter be described with reference to the sole FIGURE.

At each clock signal 58, the outputs OUT 26 of the frequency oscillators 10, 12 are scanned and buffered in the flip-flops 14, 16. The signal available at the output Q of the flip-flops 14, 16 is thus a quasi-"frozen" or held signal of the associated frequency oscillator at the instant of the last clock signal 58. The output signals of the outputs Q 32 of the flip-flops 14, 16 are applied to the inputs A 36 and B 38 of the logic circuit element 18 and subjected to an XNOR operation (Exclusive-NOR). As a result, the XNOR operation assigns one output signal at the output OUT 40 of the logic circuit element 18 to two input signals at the inputs A 36 and B 38. This result of the XNOR operation is applied to the input IN 42 of the parity generator 20. This generator is formed in such a way that it determines, in accordance with a predetermined number Nlog of clock signals, a parity of the last received Nlog results of XNOR operations and transmits it to the random-number register 22 which is formed as an Nz bit register, i.e. it stores Nz consecutive bits from the parity generator 20 to form a new random number. The read frequency of the random-number register 22 is thus the product Nlog*Nz. In other words, all of the Nlog*Nz clocks of the clock signal 58 are read from the random-number register 22 and it applies a new random number to the data bus 54. Each random number is available in a binary form as a sequence of zeroes and ones so that the random-number generator shown is a digital random-number generator.

Each random number Z applied to the data bus 54 is thus formed in accordance with Z=[bit_1, bit_2, bit_3 , . . . bit_Nz] from Nz bits, in which each bit is a parity of Nlog XNOR operations of output values f_nosz (nosz=1, . . . , Nosz) of the Nosz frequency oscillators in accordance with bit_nz=PARITY_nz[XNOR_1 (f_1 , . . . f_Nosz), . . . , XNOR_Nlog(f_1 , . . . , f_Nosz)] with nz=1, . . . ,Nz.

It will be evident that the embodiment using two frequency oscillators 10, 12 is shown only by way of example. Alternatively, three, four or more frequency oscillators may be provided. A corresponding number of flip-flops 14, 16 as well as inputs at logic circuit elements 18 is then provided. In a further alternative embodiment, the collection of the Nz bits is performed in parallel, in which the arrangement in accordance with the sole Figure is provided Nz times and the random-number register 22 buffers only one bit. Each of these arrangements then parallel supplies one bit of the random number Z with a different valence. This has the advantage that the time between two new random numbers is shorter with respect to the Nlog clocks of the clock signal 58 for parity formation.

What is claimed is:

1. A method of generating a random number sequence, particularly in a chip card or smart card, characterized by the steps of (a) scanning the outputs of Nosz independent frequency oscillators and buffering corresponding Nosz output signals of the Nosz frequency oscillators at each clock of a clock signal from an external clock signal source, (b) applying the buffered signals of step (a) to a logic operation assigning a predetermined output value to the Nosz buffered signals as input values, (c) generating the parity of a predetermined number Nlog of output values of step (b) at each Nlog$^{th}$ clock of the external clock signal, (d) storing a predetermined number Nz of parity numbers in a random-number register, and (e) reading all of the Nz*Nlog clocks of the clock signal as a random number from the random-number register.

2. A method as claimed in claim 1, characterized in that the frequency of at least one frequency oscillator is changed and/or modulated in dependence upon an MSB (Most Significant Bit) of a signature register.

3. A method as claimed in claim 2, characterized in that the frequency of the changed or modulated frequency oscillator is switched between >20 MHz and >40 MHz in dependence upon the MSB of the signature register.

4. A method as claimed in claim 2, characterized in that the frequency of at least one frequency oscillator is selected to be >30 MHz.

5. A method as claimed in claim 2, characterized in that the frequency oscillators are voltage-controlled or current-controlled.

6. A method as claimed in claim 2, characterized in that in step (a), the output signals of the two frequency oscillators are buffered in a respective flip-flop, particularly a delay flip-flop (D–F/F).

7. A method as claimed in claim 2, characterized in that in step (c) the logic operation is an AND operation (AND), an OR operation (OR), a NOR operation (NOR), an Exclusive-OR operation (XOR), a NAND operation (NAND) or an Exclusive-NOR operation (XNOR).

8. A method as claimed in claim 2, characterized in that the frequencies of the Nosz frequency oscillators are selected to be such that no frequency of a frequency oscillator is an integral multiple of another frequency oscillator or of the external clock signal.

9. A method as claimed in claim 2, characterized in that Nosz is an integer which is larger than or equal to 1, particularly Nosz=2.

10. A method as claimed in claim 2, characterized in that Nlog and Nz are integers which are larger than or equal to 1.

11. A random-number generator, particularly for a chip card or a smart card, comprising a predetermined number Nosz of mutually independent frequency oscillators (10, 12), a predetermined number Nosz of flip-flops (14, 16), in which an output (26) of a frequency oscillator (10, 12) is connected to an input D (30) of a flip-flop (14, 16), a logic circuit element (18) receiving outputs Q (32) of the flip-flops (14, 16) as input values (36, 38) and, in accordance with a predetermined logic operation, assigns an output value (40) to these input values (36, 38), a parity circuit (20) determining the parity of a predetermined number Nlog of output values (40) from the logic circuit element (18), a random-number register (22) which buffers a predetermined number Nz of parity numbers (44) from the parity circuit (20) and supplies them as Nz bit random number, and an input (58) for an external clock signal source which clocks the flip-flops (14, 16), the parity circuit (20) and the random-number register (22).

12. A random-number generator as claimed in claim 11, characterized in that at least one frequency oscillator (10) is connected to an output of a signature register which applies an MSB (Most Significant Bit) (29) to the frequency oscillator, the frequency of the frequency oscillator (10) changing in dependence upon the MSB (29) of the signature register.

13. A random-number generator as claimed in claim 12, characterized in that the frequency oscillator (10) connected to the signature register is formed in such a way that it switches its frequency between >20 MHz and >40 MHz in dependence upon the MSB (29) of the signature register.

14. A random-number generator as claimed in claim 11, characterized in that the frequency of at least one frequency oscillator (12) is >30 MHz.

15. A random-number generator as claimed in claim 11, characterized in that the frequency oscillators (10, 12) are formed as voltage-controlled or current-controlled frequency oscillators.

16. A random-number generator as claimed in claim 11, characterized in that at least one flip-flop (14, 16) is formed as a delay flip-flop (D–F/F).

17. A random-number generator as claimed in claim 11, characterized in that the logic circuit element (18) is an AND element (AND), an OR element (OR), a NOR element (NOR), an Exclusive-OR element (XOR), a NAND element (NAND) or an Exclusive-NOR element (XNOR).

18. A random-number generator as claimed in claim 11, characterized in that the Nosz frequency oscillators (10, 12) are formed in such a way that no frequency of a frequency oscillator (10, 12) is an integral multiple of another frequency oscillator (10, 12) or of the external clock signal (58).

19. A random-number generator as claimed in claim 11, characterized in that Nosz is an integer which is larger than or equal to 1, particularly Nosz=2.

20. A random-number generator as claimed in claim 11, characterized in that Nlog and Nz are integers which are larger than or equal to 1.

* * * * *